(12) United States Patent
Chien-Jen et al.

(10) Patent No.: US 9,703,688 B2
(45) Date of Patent: Jul. 11, 2017

(54) PROGRESS METRIC FOR COMBINATORIAL MODELS

(71) Applicant: International Business Machines Corporation, Armonk, NY (US)

(72) Inventors: Hsu Chien-Jen, Morrisville, NC (US); Itai Segall, Tel-Aviv (IL); Rachel Tzoref-Brill, Haifa (IL); Aviad Zlotnick, Mitzpeh Netofah (IL)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 14/243,898

(22) Filed: Apr. 3, 2014

(65) Prior Publication Data
US 2015/0286553 A1    Oct. 8, 2015

(51) Int. Cl.
G06F 9/44 (2006.01)
G06F 11/00 (2006.01)
G06F 11/36 (2006.01)

(52) U.S. Cl.
CPC ...... *G06F 11/3684* (2013.01); *G06F 11/3616* (2013.01)

(58) Field of Classification Search
CPC .................. G06F 11/3684; G06F 11/3616
USPC ............................................... 717/124
See application file for complete search history.

(56) References Cited

U.S. PATENT DOCUMENTS

| | | | | |
|---|---|---|---|---|
| 5,146,491 A | * | 9/1992 | Silver | H04M 15/08 379/114.24 |
| 5,978,940 A | * | 11/1999 | Newman | H04Q 3/0087 714/712 |
| 6,167,124 A | * | 12/2000 | Johnson | H04L 12/24 379/112.01 |
| 7,024,589 B2 | | 4/2006 | Hartman et al. | |
| 7,640,470 B2 | | 12/2009 | Lammel et al. | |
| 8,010,325 B2 | * | 8/2011 | De Barros et al. | 703/2 |
| 8,386,851 B2 | | 2/2013 | Ur | |
| 2004/0205184 A1 | * | 10/2004 | Olsson et al. | 709/224 |
| 2004/0260516 A1 | * | 12/2004 | Czerwonka | 702/186 |
| 2007/0028213 A1 | * | 2/2007 | D'Alo | G06Q 10/063118 717/120 |
| 2010/0146339 A1 | * | 6/2010 | Hansson et al. | 714/37 |
| 2011/0246511 A1 | | 10/2011 | Smith et al. | |
| 2012/0260132 A1 | | 10/2012 | Blue et al. | |
| 2013/0110489 A1 | | 5/2013 | Farchi et al. | |

OTHER PUBLICATIONS

Segall et al., "Interactive refinement of combinatorial test plans", 34th International Conference on Software Engineering (ICSE), Zurich, Jun. 2012, pp. 1371-1374.
Kuhn et al., "Practical combinatorial testing", National Institute of Standards and Technology, NIST Special Publication 800-142, Oct. 2010. Can be found at : http://csrc.nist.gov/groups/SNS/acts/documents/SP800-142-101006.pdf.

* cited by examiner

*Primary Examiner* — James D Rutten

(57) ABSTRACT

Techniques for monitoring computer program test design are described herein. The techniques include a method that specifies a subset of tuples in a combinatorial test model as supervised. At least some of the supervised tuples are confirmed using expert data. The method may include determining a metric indicating progress of the combinatorial test modeling process based on the supervised tuples and the confirmed tuples.

11 Claims, 5 Drawing Sheets

100

400

PROGRESS METRIC FOR COMBINATORIAL MODELS

BACKGROUND

The present invention relates to testing of computer programs. More specifically, the present invention relates to monitoring progress of computer program test design using combinatorial models. A combinatorial model is a set of attributes, values for each attributes, and restrictions on value combinations that may be identified as valid or invalid. A combinatorial model may enable a practitioner to specify tuples, which are combinations of attributes in various test scenarios. In other words, a combinatorial model may span a space of valid tests for testing a computer program to verify that none of the tuples cause undesired behavior when they are encountered during program execution.

SUMMARY

In one embodiment, a method for determining a progress metric is described herein. The method may include specifying a subset of tuples in a combinatorial test model as supervised tuples. At least some of the supervised tuples may be confirmed using expert data. The method may include determining a metric indicating progress of the combinatorial test modeling process based on the confirmed tuples.

In another embodiment, a computing device including a storage device and a processor is described herein. The storage device includes instructions that when executed by the processor, cause the computing device to specify a subset of tuples in a combinatorial test model as supervised tuples. At least some of the supervised tuples may be confirmed using expert data. The storage device includes instructions that when executed by the processor, cause the computing device to determine a metric indicating progress of the combinatorial test modeling process based on the confirmed tuples.

In yet another embodiment, a tangible computer-readable storage medium comprising instructions to direct a processor to carry out operations is described herein. The operations include specifying a subset of tuples in a combinatorial test model as supervised tuples. At least some of the supervised tuples may be confirmed using expert data. The operations may include determining a metric indicating progress of the combinatorial test modeling process based on and the confirmed tuples.

DETAILED DESCRIPTION

The subject matter disclosed herein relates to techniques for providing a progress metric for a combinatorial test modeling process. As software systems become increasingly more complex, verifying their correctness is even more challenging. The introduction of service-oriented architectures contributes to the trend of highly configurable systems in which many optional attributes coexist and might unintentionally interact with each other in a faulty way. Combinatorial modeling, such as combinatorial test design (CTD), is a test planning technique in which the space to be tested is modeled by a set of attributes, their respective values, and restrictions on their respective value combinations. A bug, or error, in a computer program may depend on the combination of a small number of attribute values, i.e., tuples indicating combinations of those values.

In some scenarios, a user, such as a combinatorial modeling practitioner, performs the task of building a combinatorial model. As the combinatorial modeling practitioner introduces attributes and attribute values into the combinatorial model, it may be helpful to introduce restrictions related to combinations. The combinations, referred to herein as tuples, may include tuples of attributes, tuples of attribute values, or any combination of tuples of attributes and tuples of attribute values.

However, the combinatorial modeling practitioner may not know all of the restrictions that may need to be implemented in the combinatorial model, and may rely on a subject matter expert (SME) such as a client requesting design of the computer program. The embodiments described herein relate to specifying tuples as being supervised by a SME and at least some of supervised tuples are confirmed using expert data. Once the SME confirms supervised tuples, a metric may be determined based on the number of supervised tuples to the number of supervised tuples that have been confirmed.

An attribute, as referred to herein, is a feature, a function, a parameter, a variable, or any combination thereof, of the computer program. An attribute value, as referred to herein, is a given value associated with an attribute. A tuple, as referred to herein, is a combination of attributes, a combination of attribute values, or any combination of attributes and values.

Figure 1:
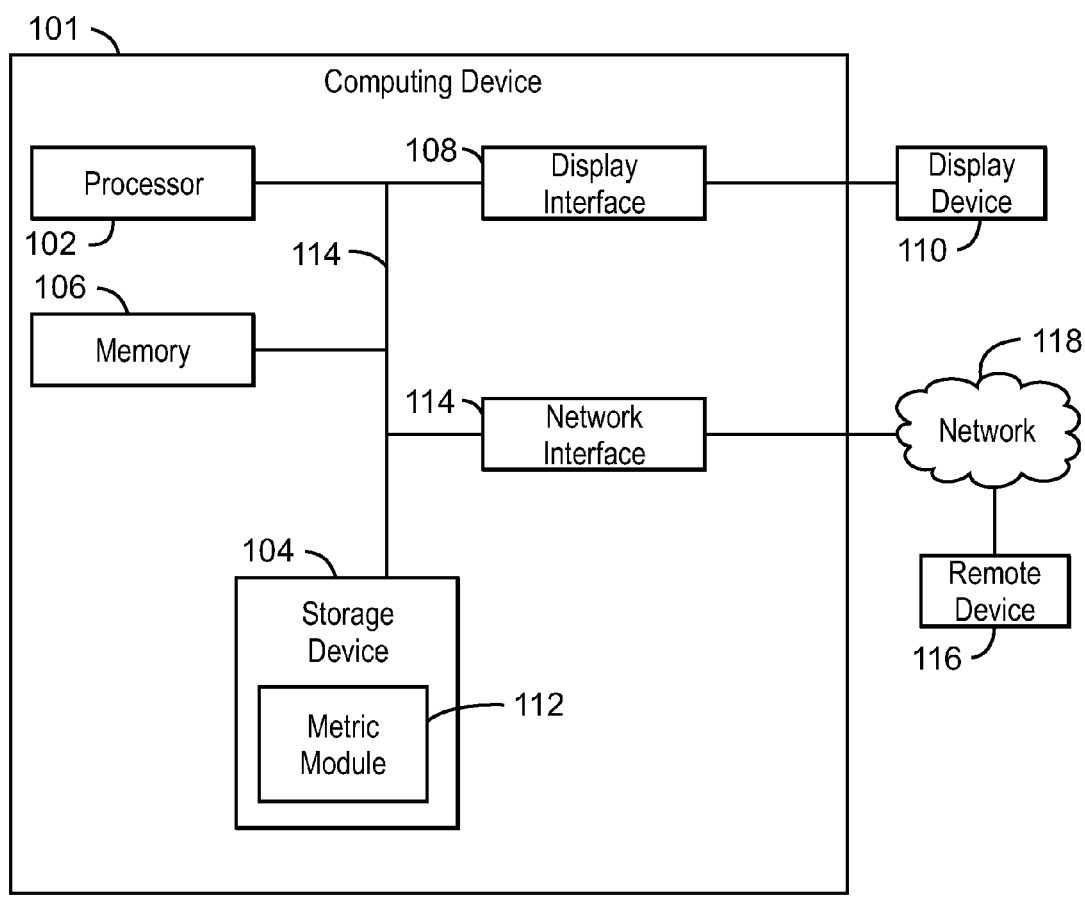
FIG. 1 is a block diagram of a computing system configured to determine a progress metric of a combinatorial test modeling process.

FIG. 1 is a block diagram of a computing system configured to determine a progress metric of a combinatorial test modeling process. The computing system 100 may include a computing device 101 having a processor 102, a storage device 104 comprising a non-transitory computer-readable medium, a memory device 106, a display interface 108 communicatively coupled to a display device 110. The storage device 104 may include a metric module 112 configured to determine a metric indicating progress based on the confirmed tuples.

In some embodiments, the metric is rendered at a graphical user interface at the display device 110. Further, the computing device 101 may include a network interface 114 configured to enable a remote device 116 to view the metric and tuples associated with a combinatorial test model via a network 118.

The metric module 112 may be logic, at least partially comprising hardware logic. In embodiments, the graph module 112 may be implemented as instructions executable by a processing device, such as the processor 102. The instructions may direct the processor to specify a subset of tuples in a combinatorial test model as supervised. At least some of the supervised tuples may be confirmed using expert data via a graphical user interface at the display device 110 of the computing device 101, at a graphical user interface of a remote computing device 116 via the network 118. The instructions may direct the processor to determine a metric indicating progress of the combinatorial test modeling process based on the confirmed tuples.

For example, telecommunications software may be configured to work with different types of calls (local, long distance, international), billing (caller, phone card, 800 numbers), access (ISDN, VOIP, PBX) and server for billing (Windows Server, Linux/MySQL). In this example, the attributes are different types of calls, different types of billing, different types of accesses, and difference types of servers for billing. The software under test must be able to handle any combination of attribute values generated by a test design method based on the combinatorial test model being constructed. For example, the combination of a call having a value of local, with the type of billing using 800 numbers, should be produced in the combinatorial test model only if is possible to create such a condition for the system under test to handle. Therefore, the combination of call having a value of local, and the type of billing having a value associated with 800 numbers may need to be specified and presented to an associated SME for confirmation. When a plurality of tuples are specified as supervised, then a metric may be determined indicating the number of tuples that have been specified as supervised in relation to the number of tuples that are supervised and are also confirmed.

The progress metric enables a combinatorial modeling practitioner to grasp to what extent attributes and associated tuples in the combinatorial test model have been confirmed. Further, the progress metric may be useful for management of the combinatorial modeling project by providing quantitative indication of the progress of building the combinatorial model.

As discussed above, the metric module 112 may be logic, configured to carry out the instructions for determining a progress metric. Alternatively or additionally, the metric module 112 may be a set of instructions implemented by the processor. The processor 102 of the computing device 101 of FIG. 1 may be a main processor that is adapted to execute the stored instructions. The processor 102 may be a single core processor, a multi-core processor, a computing cluster, or any number of other configurations. The memory unit 106 can include random access memory, read only memory, flash memory, or any other suitable memory systems. The main processor 102 may be connected through a system bus 114 to components including the memory 106, the storage device 104, and the display interface 108.

The block diagram of FIG. 1 is not intended to indicate that the computing device 101 is to include all of the components shown in FIG. 1. Further, the computing device 101 may include any number of additional components not shown in FIG. 1, depending on the details of the specific implementation.

Figure 2:
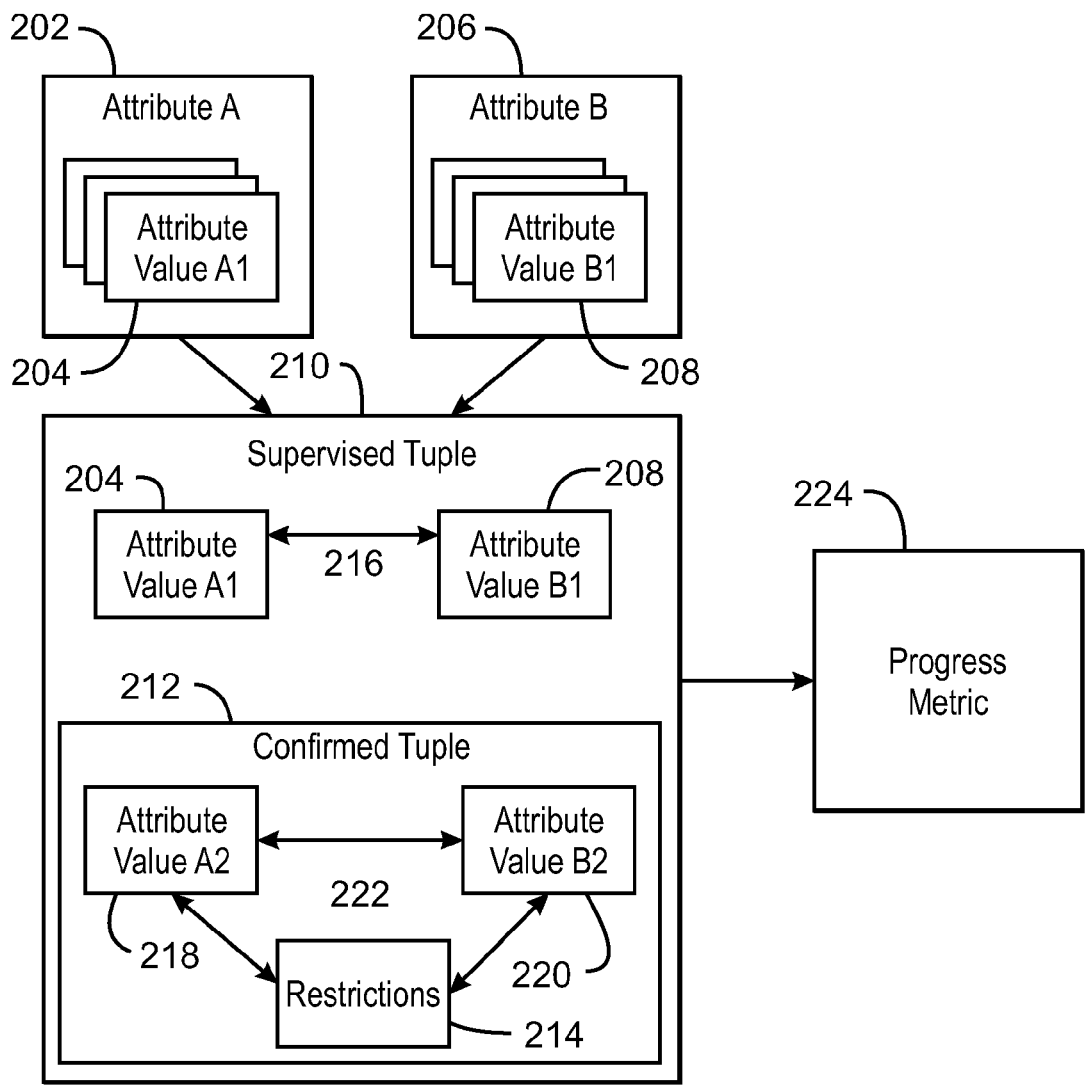
FIG. 2 is a flow diagram illustrating the determination of a progress metric.

FIG. 2 is a flow diagram illustrating the determination of a progress metric. As discussed above in reference to FIG. 1, attributes may include attribute values. As illustrated in FIG. 2, attribute "A" may have various attribute values including attribute value "A1" 204. Attribute B 206 may include various attribute values including attribute value "B1" 208. The various combinations of attribute values with other attribute values create tuples. At any time in the modeling process, the model may indicate that each tuple is valid or invalid. In some embodiments, the tuples are supervised by a subject matter expert, creating supervised tuples 210. Among the supervised tuples 210 there may be confirmed tuples 212. Confirmed tuples 212 are tuples whose validity according to the model has been confirmed by the subject matter expert to be a correct representation of the system under test. As illustrated in FIG. 2, supervised tuples 210 include a tuple 212 consisting of attribute value 204 and attribute value 208 as indicated by the arrow 216. Confirmed tuples 212 include attribute value 218 and attribute value 220 as indicated by the arrows 222. The progress metric 224 may be determined based on the number of supervised and confirmed tuples 212 in relation to the total number of supervised tuples 210 that have not been confirmed. In some embodiments, the progress metric 224 is a ratio of confirmed tuples 212 to the total number of supervised tuples 210. In some embodiments, the progress metric 224 is an aggregate combination of confirmed tuples 212 divided by an aggregate combination of confirmed tuples 212.

As noted above, a supervised tuple may consist of attributes or of attribute values. It should be noted that when a supervised tuple consists of attributes, confirming the validity of the tuple consists of confirming the model-indicated validity of all the combinations of the values of the attributes in the tuple.

Figure 3:
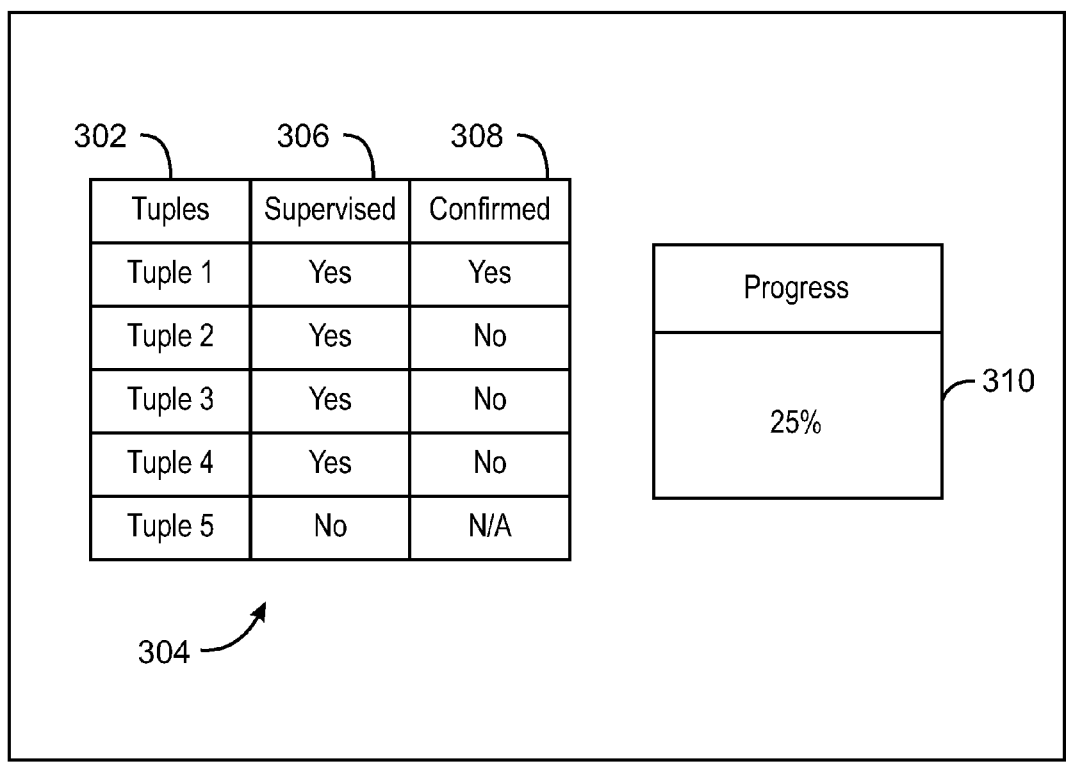
FIG. 3 is an example of a graphical user interface configured to render a metric indicating progress of a combinatorial test modeling process.

FIG. 3 is an example of a graphical user interface configured to render a metric indicating progress of a combinatorial test modeling process. As discussed above, the computer program test may be based on a combinatorial model. The combinatorial model may include tuples 302 comprised of combinations of attribute values. The table 304 illustrated in FIG. 3, lists the number of tuples 302 for a given combinatorial model, or for a given portion of a combinatorial model. The tuples 302 may be supervised as illustrated in column 306, and each of the supervised tuples may be confirmed or not confirmed as illustrated in column 308. The progress indicator 310 displays a metric at the graphical user interface 300 indicating the number of confirmed tuples to the number of supervised tuples. In the example illustrated in FIG. 3, the progress metric 310 is 25% because of the 4 supervised tuples, only 1 has been confirmed.

Figure 4:
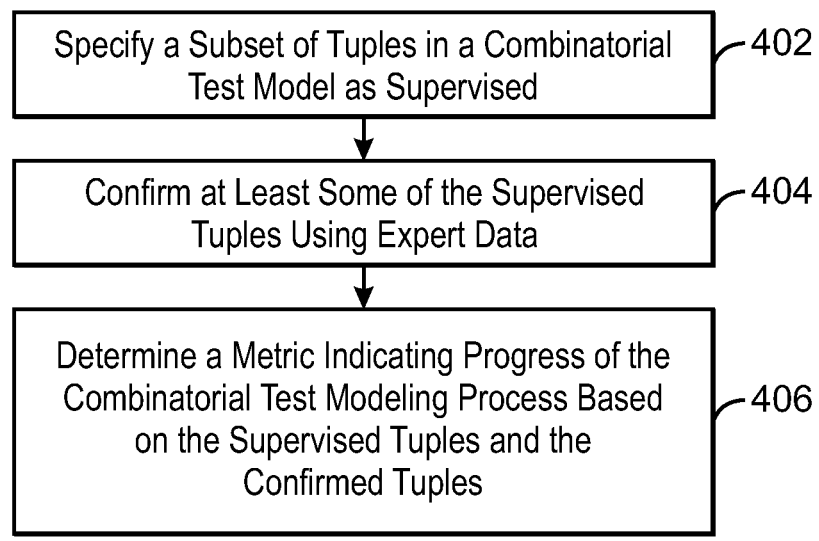
FIG. 4 is a block diagram illustrating a method for determining a progress metric of a combinatorial test modeling process.

FIG. 4 is a block diagram illustrating a method for determining a progress metric of a combinatorial test modeling process. The method 400 may include specifying a subset of tuples in a combinatorial test model as supervised tuples at block 402. The combinatorial model may be a combinatorial computer program model, such as a CTD model discussed above. At block 404, the method 400 includes confirming at least some of the supervised tuples using expert data. At block 406, the method 400 includes determining a metric indicating progress of the combinatorial test modeling process based on the confirmed tuples.

An expert, such as an SME may indicate by confirmation tuples that are not allowed in the combinatorial model test. In embodiments, the metric indicating progress includes a ratio of confirmed tuples that are supervised to unconfirmed tuples that are supervised. In embodiments, the metric indicating progress includes a ratio of aggregate combinations of confirmed tuples that are supervised to aggregate combinations of unconfirmed tuples that are supervised. In embodiments, the metric indicating progress includes any combination of the ratios discussed above.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
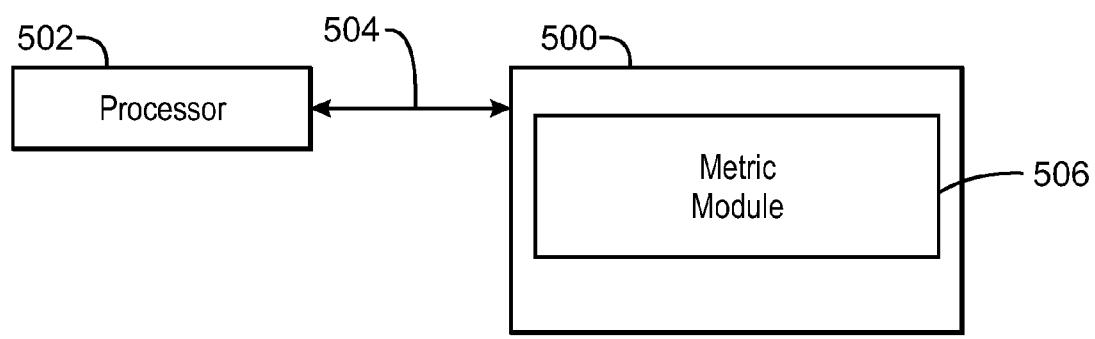
FIG. 5 is a block diagram depicting an example of a tangible, non-transitory computer-readable medium that can be used to determine a progress metric of a combinatorial test modeling process.

FIG. 5 is a block diagram depicting an example of a tangible, non-transitory computer-readable medium that can be used to determine a progress metric of a combinatorial test modeling process. The tangible, non-transitory, computer-readable medium 500 may be accessed by a processor 502 over a computer bus 504. Furthermore, the tangible, non-transitory, computer-readable medium 500 may include computer-executable instructions to direct the processor 502 to perform the steps of the current method.

The various software components discussed herein may be stored on the tangible, non-transitory, computer-readable medium 500, as indicated in FIG. 5. For example, a metric module 506 may be configured to specify a subset of tuples in a combinatorial test model as supervised tuples and to confirm at least some of the supervised tuples using expert data. Further, the metric module 506 may be configured to determine a metric indicating progress of the combinatorial test modeling process based on the confirmed tuples.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computing device, comprising:
a storage device;
a processor;
the storage device having instructions that when executed by the processor, cause the computing device to:
identify a subset of tuples in building a combinatorial test model as supervised tuples that are to be confirmed using expert data, wherein the subset of tuples comprises tuples of attributes of the combinatorial test model, tuples of attribute values of the combinatorial test model, or any combination thereof, and wherein each of the attributes corresponds to a parameter, or a variable of a computer program, wherein the parameter or the variable indicates a billing type corresponding to a caller or a phone card, and wherein at least one of the tuples of attribute values corresponds to a restriction on a value combination, wherein the value combination comprises:
a phone call type comprising a local phone call, a long distance phone call, or an international phone call;
the billing type;
an access type comprising VOIP or PBX; and
a server billing type;
confirm at least some of the supervised tuples using the expert data;
determine a metric indicating progress of the building of the combinatorial test model based on the confirmed tuples; and
manage a combinatorial modeling project based on the metric.

2. The computing device of claim 1, wherein the metric comprises a ratio of supervised tuples that have not been confirmed to supervised tuples that have been confirmed.

3. The computing device of claim 1, wherein the metric indicating progress of the building of the combinatorial test model is dynamically updated throughout the building of the combinatorial test model.

4. The computing device of claim 1, wherein the metric indicating progress of the building of the combinatorial test model is determined for a subset of an overall combinatorial test model.

5. The computing device of claim 1, wherein a supervised tuple is a tuple that is designated to be supervised such that a validity of the tuples may be specified by the expert data through confirmation.

6. A computer program product for monitoring application design, the computer product comprising a computer readable storage medium having program code embodied therewith, the program code executable by a processor to perform a method comprising:
identifying a subset of tuples in building a combinatorial test model as supervised tuples that are to be confirmed using expert data, wherein the subset of tuples comprises tuples of attributes of the combinatorial test model, tuples of attribute values of the combinatorial test model, or any combination thereof, and wherein each of the attributes corresponds to a parameter, or a variable of a computer program, wherein the parameter or the variable indicates a billing type corresponding to a caller or a phone card, and wherein at least one of the tuples of attribute values corresponds to a restriction on a value combination, wherein the value combination comprises:
a phone call type comprising a local phone call, a long distance phone call, or an international phone call;
the billing type;
an access type comprising VOIP or PBX; and
a server billing type;
confirming at least some of the supervised tuples using the expert data;
determining a metric indicating progress of the building of the combinatorial test model based on the confirmed tuples; and
managing a combinatorial modeling project based on the metric.

7. The computer program product of claim 6, wherein the metric comprises a ratio of supervised tuples to supervised tuples that have been confirmed.

8. The computer program product of claim 6, wherein the metric indicating progress of the building of the combinatorial test model is determined for a subset of an overall combinatorial test model, and wherein the metric indicating progress of the building of the combinatorial test model is dynamically updated throughout the building of the combinatorial test model.

9. The computer program product of claim 6, wherein confirming the supervised tuples comprises providing an interface for an expert to confirm supervised tuples.

10. The computer program product of claim 6, wherein the metric indicating progress of the building of the combinatorial test model is dynamically updated throughout the building of the combinatorial test model.

11. The computer program product of claim 6, wherein the metric indicating progress of the building of the combinatorial test model is determined for a subset of an overall combinatorial test model.

* * * * *